United States Patent [19]

Taylor

[11] Patent Number: 4,679,394
[45] Date of Patent: Jul. 14, 1987

[54] GAS TURBINE ENGINE POWER PLANT

[75] Inventor: Maurice I. Taylor, Allestree, England

[73] Assignee: Rolls-Royce plc, London, England

[21] Appl. No.: 33,093

[22] Filed: Apr. 24, 1979

[30] Foreign Application Priority Data

May 30, 1978 [GB] United Kingdom .................... 24115

[51] Int. Cl.⁴ .............................................. F02K 3/12
[52] U.S. Cl. ........................................ 60/224; 60/229; 239/265.29; 244/12.3; 244/12.5; 244/23 D
[58] Field of Search .............. 60/229, 263, 224, 39.21; 239/265.25, 265.27, 265.29; 244/12.3, 12.4, 12.5, 23 B, 23 D, 52

[56] References Cited

U.S. PATENT DOCUMENTS 2,912,189 11/1959 Pouit .................................... 244/52
3,161,374 12/1964 Allred et al. ...................... 244/12.3
3,279,191 10/1966 Keenan et al. ....................... 60/263

FOREIGN PATENT DOCUMENTS 580995 9/1946 United Kingdom ................. 244/52

Primary Examiner—Stephen C. Bentley
Attorney, Agent, or Firm—Cushman, Darby & Cushman

[57] ABSTRACT

A nozzle structure for a gas turbine power plant for a V.T.O.L. or S.T.O.L. type aircraft includes a main engine and at least one auxiliary engine; the efflux from the at least one auxiliary engine may be directed downwardly or alternatively horizontally through a convergent/divergent nozzle which may be closed off when the at least one auxiliary engine is inoperative.

7 Claims, 5 Drawing Figures

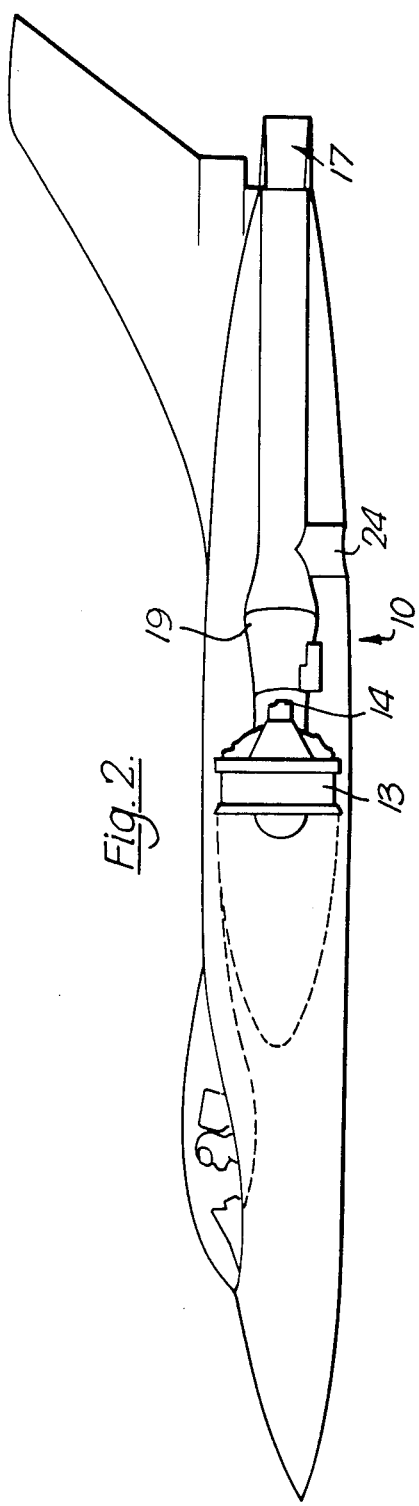
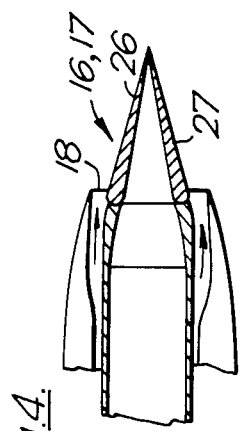
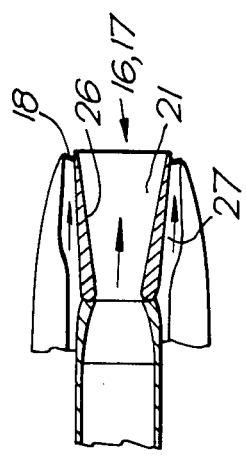
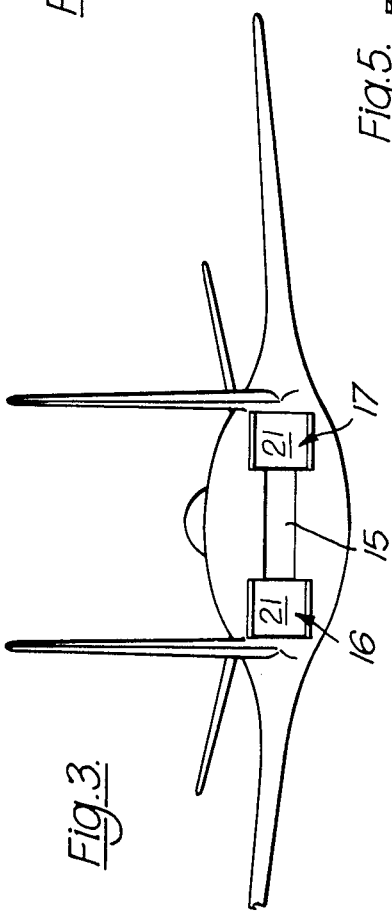

GAS TURBINE ENGINE POWER PLANT

This invention relates to gas turbine engine power plants and in particular to gas turbine engine power plants suitable for use in Vertical Take Off and Landing or Short Take Off and Landing (V.T.O.L. or S.T.O.L.) type aircraft.

It is well known to provide such aircraft with a single gas turbine engine having plurality of pivotal exhaust nozzles by means of which the direction of thrust produced by the engine may be varied. The aircraft can either be propelled forward in conventional flight with the nozzles discharging rearwards, or it can hover, or move vertically with the nozzles discharging vertically downwards. The nozzles may be adjusted such as to provide both a degree of vertical lift and horizontal propulsion for transition between conventional forward flight and hover.

The best known type of such engines is provided with four pivotable exhaust nozzles, the downstream two of which are supplied with hot exhaust gas, the upstream two of which are supplied with relatively cool bypass air.

Many proposals have been made for increasing the thrust of such engines all of which suffer disadvantages. Such engines have a low bypass ratio and consideration has been given to either "scaling up" such an engine or alternately increasing its bypass ratio. Both these actions however result in the forward nozzles and associated pipework having to be made excessively large to accommodate the increased flow of low pressure bypass air.

Alternately it has been proposed that the thrust from the two forward nozzles could be increased by burning additional fuel in the bypass air passing to the nozzles (this is commonly known as reheat or plenum chamber burning). This method suffers two main disadvantages, firstly the combustion of the fuel in the relatively low bypass air is inefficient and leads to high specific fuel consumption. Secondly uprating the thrust of the formost nozzles leads to thrust balancing problems. For an engine of this type to function satisfactorily in an airframe it is necessary to ensure that the resultant upthrust of all the nozzles pass through the centre of gravity of the engine/airframe combination when the nozzles are directed downwards. Therefore unless the forward nozzles are continuously provided with reheat the thrust balance is not maintained.

A further alternative is to provide a gas turbine power plant comprising a main engine having a propulsion nozzle or nozzles, and at least one auxiliary engine which is supplied with air from the main engine, the auxiliary engine also being provided with one or more vectorable propulsion nozzles.

All these types of engine suffer disadvantages in that they all have a relatively large frontal area which increases aircraft drag. A further disadvantage as has previously been stated is that the engine thrust vector used in supporting or raising and lowering the aircraft vertically must be arranged as close to the aircraft centre of gravity as possible. This has usually resulted in the addition of weight to the aircraft nose or tail structure to achieve the necessary balance. Obviously any unnecessary weight increase in an aircraft structure is particularly undesirable.

Furthermore gas turbine power plants of the type comprising a main engine and at least one auxiliary engine suffers a further disadvantage in that it has proved difficult to provide a nozzle arranged for both the main engine and at least one auxiliary engine which function satisfactorily under all engine operation conditions.

An object of the present invention is to provide a nozzle structure which substantially eliminates the aforementioned problems.

According to the present invention a nozzle structure suitable for a V.T.O.L. or S.T.O.L. aircraft gas turbine power plant of the type including a main gas turbine engine and at least one auxiliary engine comprises at least one main engine exhaust nozzle assembly, and at least one auxiliary exhaust nozzle assembly. The at least one auxiliary nozzle assembly includes an innermost nozzle portion and an outermost nozzle portion, the innermost nozzle portion being adapted to direct the exhaust products from the at least one auxiliary engine to atmosphere in one mode of operation and in a second mode of operation the exhaust products of the at least one auxiliary engine are directed downwards through a further vertically arranged nozzle and the outermost nozzle portion being adapted to direct a portion of the exhaust products of the main engine to atmosphere. The main engine nozzle assembly, as indicated above, directs the remaining exhaust products of the main engine to atmosphere.

Preferably the innermost nozzle portion is substantially rectangular in cross-section and is arranged symmetrically within the outermost nozzle portion which is also substantially rectangular in cross-section.

The innermost nozzle portion includes movable flaps such that it may be closed off when the at least one auxiliary engine is inoperative, but the flaps may be opened to form a convergent/divergent nozzle when the at least one auxiliary engine is in the one operative mode.

Preferably the movable flaps comprise two flaps which are secured to the top and bottom portions of the substantially rectangular innermost nozzle portion respectively.

The aircraft power plant may include two auxiliary nozzles symmetrically arranged about the main engine nozzle all of which are directed rearwardly of the aircraft.

For better understanding of the invention an embodiment thereof will now be more particularly described by way of example only and with reference to the accompanying drawings in which:

FIG. 2 shows a diagrammatic side view of the aircraft shown at FIG. 1.

FIG. 3 shows a diagrammatic rear view of the aircraft shown at FIGS. 1 and 2.

Figure 1:
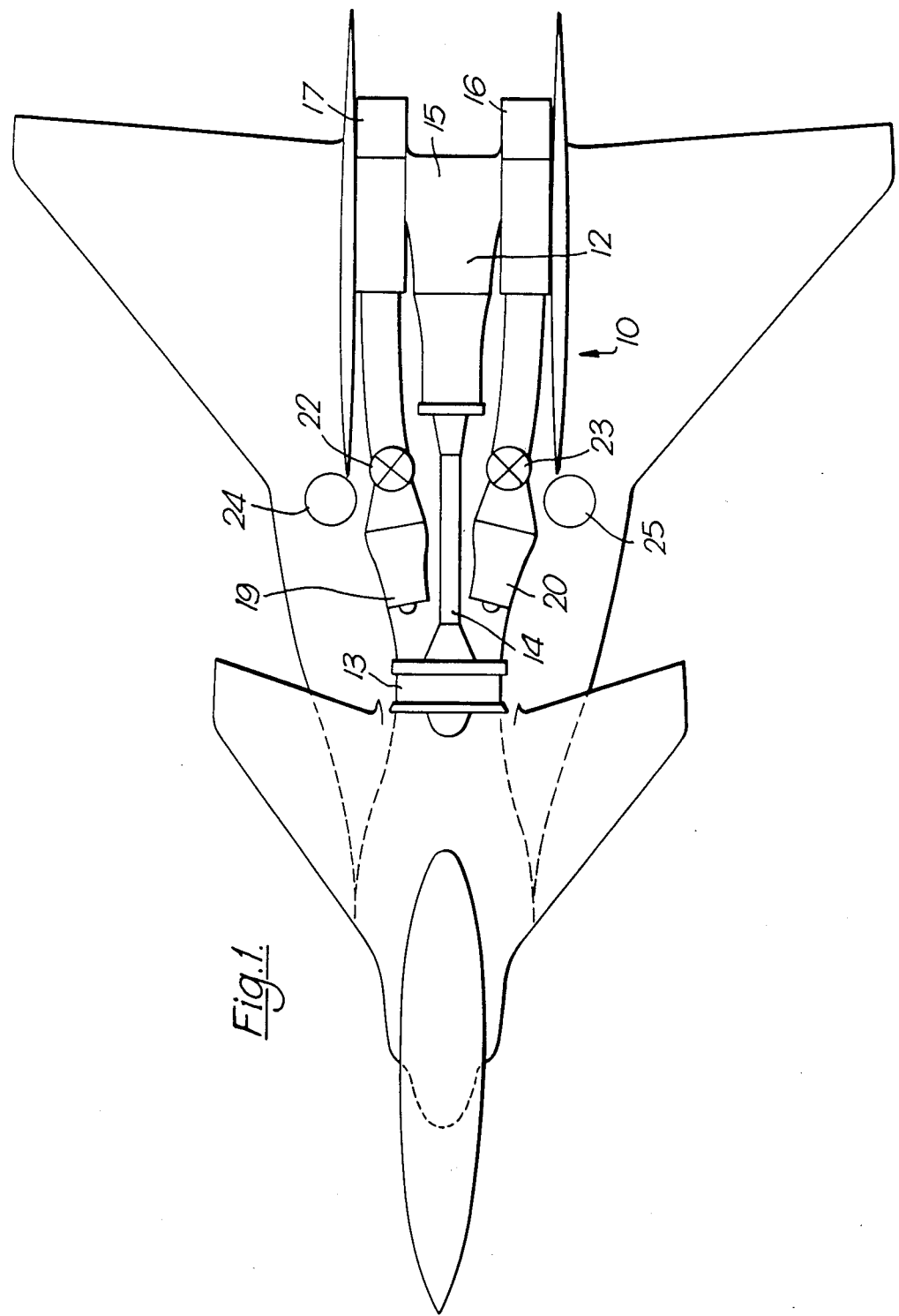
FIG. 1 shows a diagrammatic plan view of an aircraft including a gas turbine power plant made in accordance with the present invention.

FIGS. 4 and 5 each show details of a portion of the gas turbine plants nozzle structure at an enlarged scale and in greater detail.

Referring to the drawings the aircraft includes a power plant shown generally at 10 including a main gas turbine engine 12, driving a remotely located fan 13 through shaft 14. The main engine 12 may comprise any conventional two or three shaft type gas turbine engine including axial flow compressor and turbines, arranged in flow series together with the necessary combustion equipment and fuel system etc. The main gas turbine engine 12 terminates in a main engine nozzle assembly 15 through which a portion of its exhaust products may be directed, its remaining exhaust products being directed to two auxiliary nozzle assemblies 16 and 17 where they are ejected from the outer nozzle portions 18 of each nozzle assembly 16 and 17.

The fan 13 serves to generate a portion of the airflow to main engine and at least a portion of this airflow acts as a working fluid for two auxiliary engines. These engines may take the form of any conventional single or multi-shaft type gas turbine engine, the exhaust products of which are directed through the inner nozzle portion 21 of each of the nozzle assemblies 16 and 17 when the auxiliary engines are in one mode of operation.

During vertical or short take off and landing of an aircraft made in accordance with the present invention the exhaust products of the auxiliary engines 19 and 20 are directed by means of diverter valves 22 and 23 into vertically arranged exhaust nozzles 24 and 25. The two second nozzle assemblies 16 and 17 may also be provided with flaps not shown in the drawings which direct the efflux from the nozzles generally downwards to assist in take off or landing.

During normal forward flight the auxiliary engines may be shut down and the flaps 26 and 27 within each of the inner nozzle portions 21 are arranged such as to close off the inner nozzle portions 21 and the aircraft is then propelled economically solely by the main engine 12. However during high speed, or combat conditions the flaps 26, 27 are adjusted such as to form the inner nozzle portions 21 into a conventional convergent divergent type of nozzle in each nozzle assembly 16 and 17, and the efflux from the auxiliary engines 19 and 20 are directed by diverter valves 22 and 23 through the inner nozzle portions 21 to augment the flow of the main engine 12 from the main nozzle assembly 15 and the outer nozzle portions 18 of each nozzle assembly 16 and 17.

I claim:

1. A gas turbine power plant for a V.T.O.L. or S.T.O.L. aircraft comprising:
    a main gas turbine engine for the aircraft;
    a main engine exhaust nozzle assembly for receiving and discharging a portion of exhaust gases form said main gas turbine engine rearwardly of the aircraft;
    at least one auxiliary gas turbine engine;
    at least one auxiliary exhaust nozzle assembly, said auxiliary exhaust nozzle assembly including an innermost nozzle portion for discharging exhaust gases from said at least one auxiliary gas turbine engine rearwardly of the aircraft and an outermost nozzle portion for discharging a remaining portion of exhaust gases from said main gas turbine engine rearwardly of the aircraft;
    at least one vertically arranged exhaust nozzle operatively connected to said at least one auxiliary gas turbine engine for discharging exhaust gases therefrom vertically downward; and
    means selectively operable to discharge exhaust gases from said at least one auxiliary turbine engine to said innermost nozzle portion of said at least one auxiliary exhaust nozzle assembly in a first mode of operation and to said vertically arranged exhaust nozzle in a second mode of operation.

2. A gas turbine power plant as claimed in claim 1 in which said innermost nozzle portion of said at least one auxiliary exhaust nozzle is substantially rectangular in cross-section and is arranged symmetrically within said outermost nozzle portion, said outermost nozzle portion also being substantially rectangular in cross-section.

3. A gas turbine power plant as claimed in claim 1 in which said innermost nozzle portion includes movable flaps, said flaps being movable from a first position closing off said innermost nozzle portion when said at least one auxiliary engine is inoperative, and said flaps being movable to an open position to form a convergent/divergent nozzle when said at least one auxiliary engine is in said first mode of operation.

4. A gas turbine power plant as claimed in claim 3 in which said movable flaps comprise two flaps secured to top and bottom portions of said innermost nozzle portion.

5. A gas turbine power plant as claimed in claim 1 in which there are two auxiliary exhaust nozzles arranged symmetrically of said main engine exhaust nozzle.

6. A gas turbine power plant as claimed in claims 1, 2, 3, 4 or 5 including common air inlet means for said main gas turbine engine and said at least one auxiliary gas turbine engine.

7. A gas turbine power plant as claimed in claim 6 in which said common air inlet means includes a fan remotely driven from said main gas turbine engine.

* * * * *